(12) United States Patent
Allmond et al.

(10) Patent No.: US 6,374,891 B1
(45) Date of Patent: Apr. 23, 2002

(54) BIAS AIRCRAFT TIRES

(75) Inventors: Duane Vernard Allmond, Danville, VA (US); Mohammad Eghbal Sobhanie, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/710,630

(22) Filed: Nov. 9, 2000

(51) Int. Cl.$^7$ .......................... B60C 15/05; B60C 15/04
(52) U.S. Cl. ....................... 152/545; 152/540
(58) Field of Search ................... 152/545, 540

(56) References Cited

U.S. PATENT DOCUMENTS

| | | |
|---|---|---|
| 4,365,514 A | 12/1982 | Ho |
| 4,754,794 A | 7/1988 | Bocquet et al. |
| 4,887,655 A | 12/1989 | Imai et al. |
| 4,936,138 A | 6/1990 | Cushman et al. |
| 5,010,938 A | 4/1991 | Assaad et al. |
| 5,105,865 A | 4/1992 | Togashi et al. |
| 5,215,613 A | 6/1993 | Shemenski et al. |
| 5,637,164 A | 6/1997 | Dwenger et al. |
| 5,871,603 A | 2/1999 | Shimada |

FOREIGN PATENT DOCUMENTS

JP     63222908 A  * 9/1988 .................. 152/545

* cited by examiner

Primary Examiner—Adrienne C. Johnstone
(74) Attorney, Agent, or Firm—David L King

(57) ABSTRACT

An aircraft tire having at least 6 pairs of bias carcass plies and three bead cores in each bead portion is disclosed. Each bead core is specifically designed to maximize the tires durability wherein the bead heel core has at least one more row or column of bead wires when compared to the middle bead core.

10 Claims, 4 Drawing Sheets

BIAS AIRCRAFT TIRES

BACKGROUND OF THE INVENTION

This invention relates to pneumatic tires and more particularly to a novel carcass structure specifically for use in aircraft tires.

An aircraft tire is subjected to extreme operating conditions which include very high internal pressure, high speeds in excess of 300 kilometers per hour, and very high deflections. During taxing and takeoff, the deflection may be more than 30%, and on landing 45% deflection or more occur under impact conditions. These extreme pressures, loads and deflections put the sidewall between the shoulder of the tire and the bead through severe tests. The high pressure and loads place the ply cords under severe tensile loads. The cords in the plies, particularly in the lower sidewall area, are frequently mechanically fatigued due to high heat buildup near the beads while the aircraft is taxing or during takeoff.

In the prior art, it has been conventional to increase the number of plies of the tire to increase rigidity and to decrease deformation under load. Also, much work has been directed to reinforcing the ply turnup portion of tires to improve durability.

U.S. Pat. No. 5,105,865 by Togashi et al, describes these conventional solutions and proposes that the durability of the tire can be improved by avoiding bending deformations of the ply surfaces. The patent describes a tire curvature that permits an increase in durability to be achieved with no increase in weight.

U.S. Pat. No. 4,029,137 by Robert Suydam teaches that an improvement in durability can be achieved by a novel wrapping of the ply structure about the beads. This invention also improves durability without increasing weight.

In British Patent GB 2 087 806 to Kaisha, a bias aircraft tire is disclosed wherein cords of the carcass plies are spaced further apart to achieve improved durability.

In addition to the normal loading conditions of aircraft tires, military aircraft, in particular naval airships, often are required to land on the decks of aircraft carriers. The landings are routinely harsh and rapid due to the shortened landing area. To stop the aircraft, an arrestor cable is employed. The nose wheel or main landing gear wheel of the aircraft impacts this 1-⅝ inch diameter arrestor cable on landings and can severely damage the tire. On the F/A-18E/F naval aircraft the main tire can see a camber angle of 10.2°. This means that one sidewall will take the initial impact at about five times the normal rated load. This pinches the impacted sidewall severely which can result in cut or damaged carcass plies. Repeated landings result in cumulative damage. To extend the life of the main tire additional full width carcass plies have been used; however, this imposes a weight penalty: A novel approach to improve sidewall durability while enabling a reduction in overall tire weight was disclosed in U.S. Pat. No. 5,637,764. In that patent sidewall cord reinforced inserts were used to replace full plies yet provide additional sidewall bruise resistance and increased durability of the tire carcass.

Advances in ply strength and the use of these inserts has resulted in sufficiently strong carcasses. The carcasses has become so strong that on the main landing gear of the F/A 18E/F naval fighter aircraft testing evidenced that the bead cores were being sufficiently stressed that the bead cores would fail prior to the crown reinforcement during burst test. This prior art tire is depicted in FIGS. 1 and 2. As illustrated the tire had originally 12 plies and three bead cores of equal size and construction. A more robust carcass construction was requested and it was discovered that the conventional three bead core design became a limiting factor wherein the beads would fail prior to the crown of the carcass during tire burst test. As a general rule, a tire engineer tries to design the tire such that tires fail in the crown area when subjected to burst testing.

It must be appreciated that the rim and the tire's beads are confined to a limited amount of space. Accordingly, the simple addition of carcass plies means that the bead shape or configuration must be adjusted while still allowing for a proper fit to the rim. Ideally as tire designers improve the tires durability they strive hard to insure the rim design can remain unchanged. New rim designs are very costly and generally limit the use of improved tire designs to next generation vehicles or aircrafts.

It was an object of the present invention to design the tire to fit on the prior art rim while still improving the bead strength and the overall carcass strength.

It was a further object of the invention to design an aircraft tire having three bead cores in each bead portion with substantially much greater strength than conventional prior art tires they were to replace.

SUMMARY OF THE INVENTION

An improved bias aircraft tire has a carcass reinforced by six or more ply pairs the six or more ply pairs extend from one bead portion through a crown portion to an opposite bead portion. Each bead portion has three bead cores, a first heel bead core, a middle bead core and a third toe bead core. Each bead core has one or more ply pairs wrapped around and extending radially upwardly relative to the bead core.

The three bead cores in each bead portion are each of a substantially rectangular cross-section having a semi-rounded radially innermost portion. Each of the three bead cores have lateral rows and vertical columns of bead wires. Wherein, the middle bead core has at least one row or one column less of bead wires than the first heel bead core.

Each bead core has an inside diameter d. The middle bead core has a diameter $d_m$ less than the diameter $d_h$, first heel bead core.

The toe bead core has one or more row or column than the middle bead core. The toe bead core has an inside diameter $d_T$ equal to or greater than the diameter $d_m$ of the middle bead core minus the differences in the diameter $d_H$ of the first bead heel less the diameter $d_M$ of the middle bead core or $d_t \geq, d_m, -(d_h-d_m)$.

In the preferred embodiment tire the pair of carcass plies equal 7. The heel bead core has 12 rows and 8 columns of wire totaling 96 wires when viewed in cross-section. The toe bead core is the same construction as the heel also having a 12×8, 96 wire construction. The middle bead core has an 11×8 construction with 88 wires.

In the preferred tire of a size 32×11.5-15, the inside diameter $d_h$ equals 15.70 inches, $d_m$ equals 15.64 inches, and $d_t$ equals 15.54 inches thus satisfying the relationship wherein the middle bead core has a smaller diameter than the heel bead core while the toe bead core $d_t$ is greater than or equal to $d_m-(d_h-d_m)$. As in the preferred tire $d_t \geq 15.60-(15.70-15.60)$ or $d_t=15.54$ inches which is greater than 15.50.

DEFINITIONS

Figure 1:
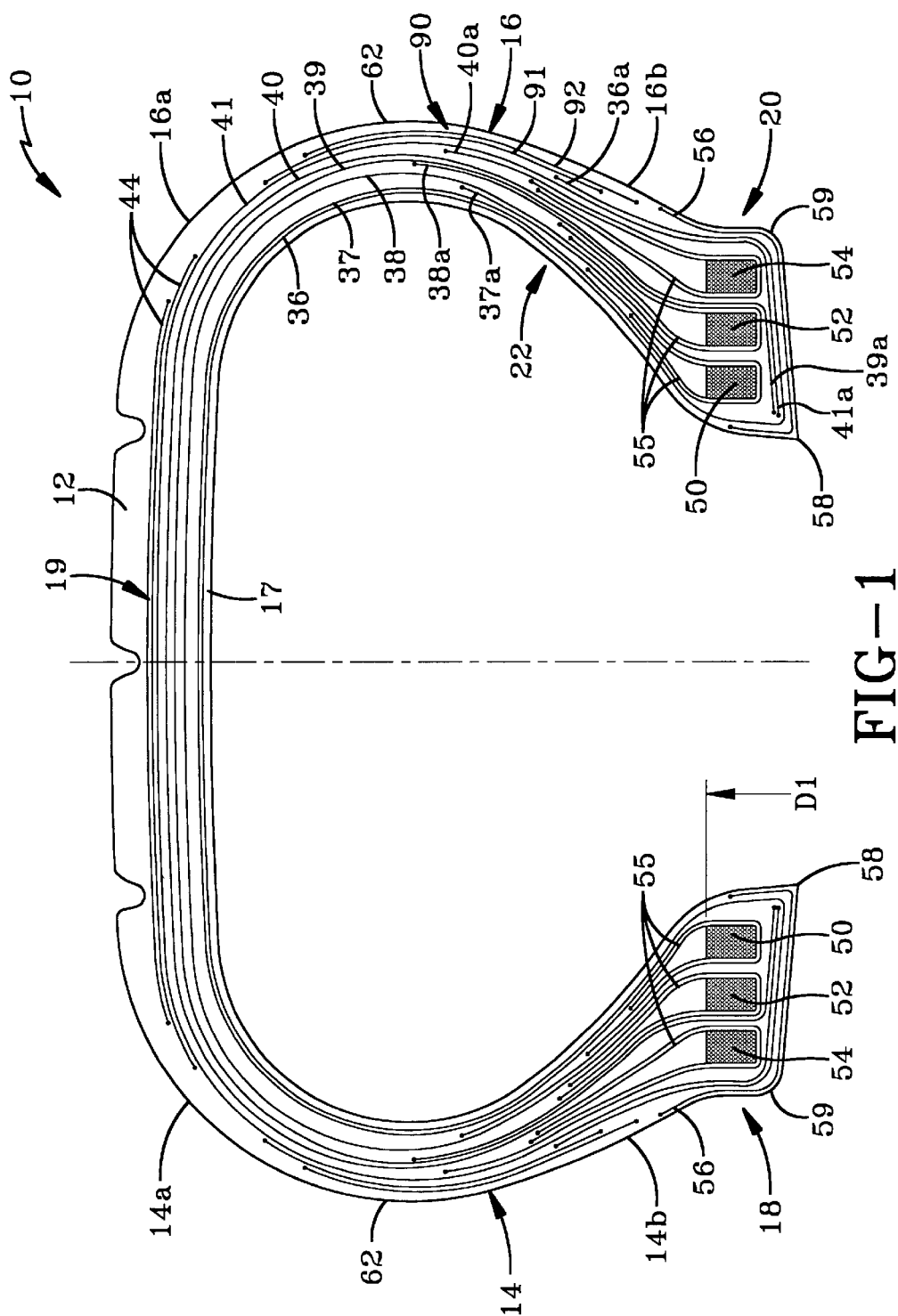
FIG. 1 is a cross-sectional view of the prior art tire of U.S. Pat. No. 5,637,764.

"Apex" means a non-reinforced elastomer positioned radially above a bead core.

"Aspect ratio" of the tire means the ratio of its section height (SH) to its section width (SW) multiplied by 100% for expression as a percentage.

"Axial" and "axially" means lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt or breaker reinforcing structure" means at least two layers of plies of parallel cords, woven or unwoven, underlying the tread, unanchored to the bead, and having both left and right cord angles in the range from 17 degrees to 33 degrees with respect to the equatorial plane of the tire.

"Bias ply tire" means a tire having a carcass with reinforcing cords in the carcass ply extending diagonally across the tire from bead core to bead core at about a 25°–50° angle with respect to the equatorial plane of the tire. Cords run at opposite angles in alternate layers.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Chafers" refers to narrow strips of material placed around the outside of the bead to protect cord plies from the rim, distribute flexing above the rim, and to seal the tire.

"Chippers" mean a reinforcement structure located in the bead portion of the tire.

"Cord" means one of the reinforcement strands of which the plies in the tire are comprised.

"Equatorial plane (EP)" means the plane perpendicular to the tire's axis of rotation and passing through the center of its tread.

"Flipper" means a reinforced fabric wrapped about the bead core and apex.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Net-to-gross ratio" means the ratio of the tire tread rubber that makes contact with the road surface while in the footprint, divided by the area of the tread in the footprint, including non-contacting portions such as grooves.

"Nominal rim diameter" means the average diameter of the rim flange at the location where the bead portion of the tire seats.

"Normal inflation pressure" refers to the specific design inflation pressure and load assigned by the appropriate standards organization for the service condition for the tire.

"Normal load" refers to the specific design inflation pressure and load assigned by the appropriate standards organization for the service condition for the tire.

"Ply" means a continuous layer of rubber-coated parallel cords.

"Radial" and "radially" means directions radially toward or away from the axis of rotation of the tire.

"Radial-ply tire" means a belted or circumferentially-restricted pneumatic tire in which the ply cords which extend from bead to bead are laid at cord angles between 65° and 90° with respect to the equatorial plane of the tire.

"Section height" (SH) means the radial distance from the nominal rim diameter to the outer diameter of the tire at its equatorial plane.

DETAILED DESCRIPTION OF THE INVENTION

Figure 3:
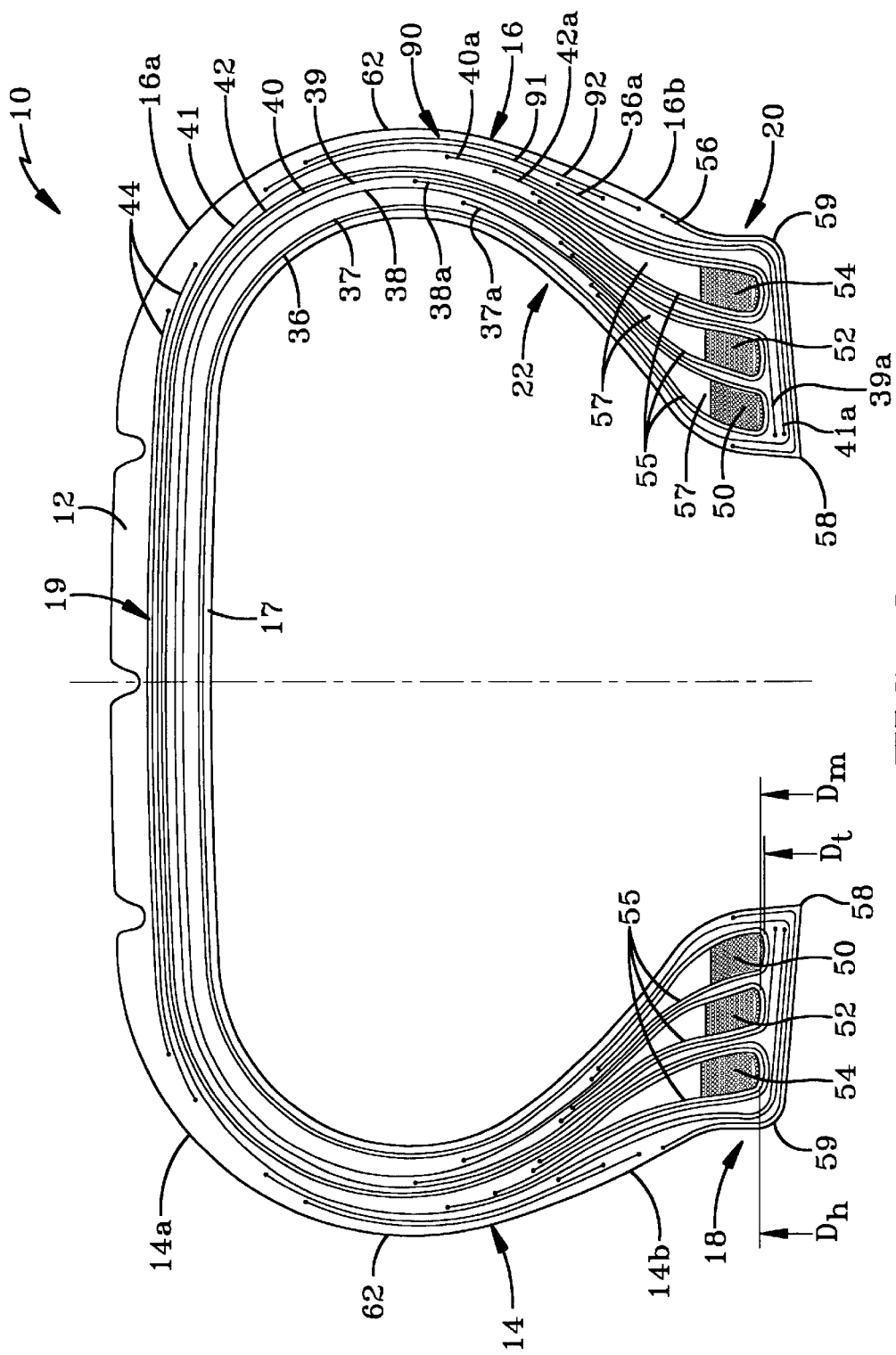
FIG. 3 is a cross-sectional view illustrating the improved aircraft tire made in accordance with the present invention.

With reference to FIG. 3, there is illustrated a tire 10 which in the specific embodiment illustrated is a size 32×11.5-15 tire. The tire has a 81.3 cm (32 inch) maximum inflated outside diameter and the maximum width of the inflated tire in axial directions is 29.2 cm (11.5 inches) and the tire has a nominal bead diameter of 38.1 cm (15 inches).

The tire 10 includes a ground engaging circumferentially extending tread portion 12, a pair of sidewalls 14,16 extending radially inwardly from the axially outer edges of the tread portion and terminating at their radial extremities in a pair of bead portions 18,20. The sidewalls 14,16 each have an upper portion 14A,16A in the shoulder region of the tire radially inward of the tread and radially outward of the maximum section width of the tire, and a lower portion 14B,16B radially inward of the maximum section width of the tire. A cord reinforced carcass structure 22 extends circumferentially about the tire and from bead portion 18 to bead portion 20.

The particular embodiment of the cord reinforcing structure 22 includes seven pairs of plies of tire cord fabric 36,37,38,39,40, 41 and 42. Each pair of plies has one of its plies extending at one bias angle with respect to the equatorial plane or circumferential center line of the tire, and the other ply at the same angle but extending in the opposite direction with respect to the equatorial plane. The angle that the cords in the individual carcass plies make with respect to the equatorial plane decreases progressively from an angle of about 34° in the radially inner pair of plies 36 to 30° in the radially outer pair of plies 41.

Also included in the carcass structure is a pair of tread breaker plies 44 extending circumferentially about the carcass and generally from one edge of the tread portion 12 to the axially opposite edge of the tread portion 12. The angle of the cords in the tread breaker plies with respect to the equatorial plane is approximately 26°. The material of the cords in all of the plies in the carcass structure 22 is nylon although any suitable material or combination of materials can be utilized. It is believed preferable that the cords be a textile material. Further, while specific angles have been specified for the carcass and tread plies, these angles can be varied within the normal range of bias ply aircraft tires. For example, the angles of the carcass plies could be from 25° to 45° while the angle of the tread breaker plies can be from about 20° to 45° for a bias ply aircraft tire.

Interposed between the tread breaker plies 44 and the carcass plies is a cushion gum layer 19.

The bead portions 18,20 each include three annular inextensible bead cores 50,52 and 54.

Two pairs of carcass plies 36 and 37 extend radially inwardly of the tire adjacent to the axially inner side of the axially inner bead core 50. The respective end portions 36a and 37a are turned axially outwardly about bead core 50 and ply ends 37a are turned radially outwardly about bead core 50 while ply end 36a turns radially outwardly-about bead core 54.

Carcass plies 38 similarly extend radially inwardly adjacent to the axially inner side of the central or middle bead core 52 and have their end portions 38a turned radially outwardly of the bead core 52.

Carcass plies 39 extend radially inwardly about the axially outer side of the middle bead core 52 and the ply ends 39a are turned axially inwardly adjacent the radially inner sides of the inextensible bead cores 50 and 52. Since the pairs of carcass plies 39 are wrapped about two sides of the bead core 52 as they progress radially inwardly from the tread 12, the tensile loading of these plies caused by inflation pressure and loading on the tire are supported by bead core 52.

The axially outer bead core 54 has two pairs of carcass plies 40,42 extending radially inwardly adjacent the axially inner side of the bead core and has its ends 40a,42a turned axially outwardly adjacent the radially inner side of the bead core. The turnup ends 40a turns radially outwardly adjacent the turnup ends 42a which are adjacent and turnup around axially outer side of the bead core 54.

Carcass plies 41 extend radially inwardly interposed between the turnup ends 36a and the axially outer side of the bead core 54. The carcass ply end portions 41 a each turn axially inwardly adjacent the radially inner side of bead core 54 extending inwardly to the radially inner side of bead core 50. The end 41a is interposed between the bead cores 50,52 and 54's radially inner sides and the end 36a. The ends 36a terminate in the lower sidewall area at a point radially inwardly of the point 62 of maximum section width of the inflated tire.

For the purposes of this invention, end portions shall be those portions of a carcass ply pairs that wraps about or extends radially outwardly from a bead core. If the end portions terminate short of the point 62 of maximum axial width of the tire, it is not considered working portions of the plies since it does not exert a significant radially outwardly directed pull on the bead core. A bead core that absorbs a major radially outwardly directed pull of the carcass plies is an active or working bead core, and for purposes of this invention is a bead core bounded on any axial side and a radially inner side by the working portions of the carcass plies. The working portions of the carcass plies is that portion of the plies extending from a bead on one side of the tire to the opposite side's bead, and for purposes of this invention the working portion of the carcass plies is called the ply side; the non-working portion is the turn-up or end portions of the plies.

Figure 4:
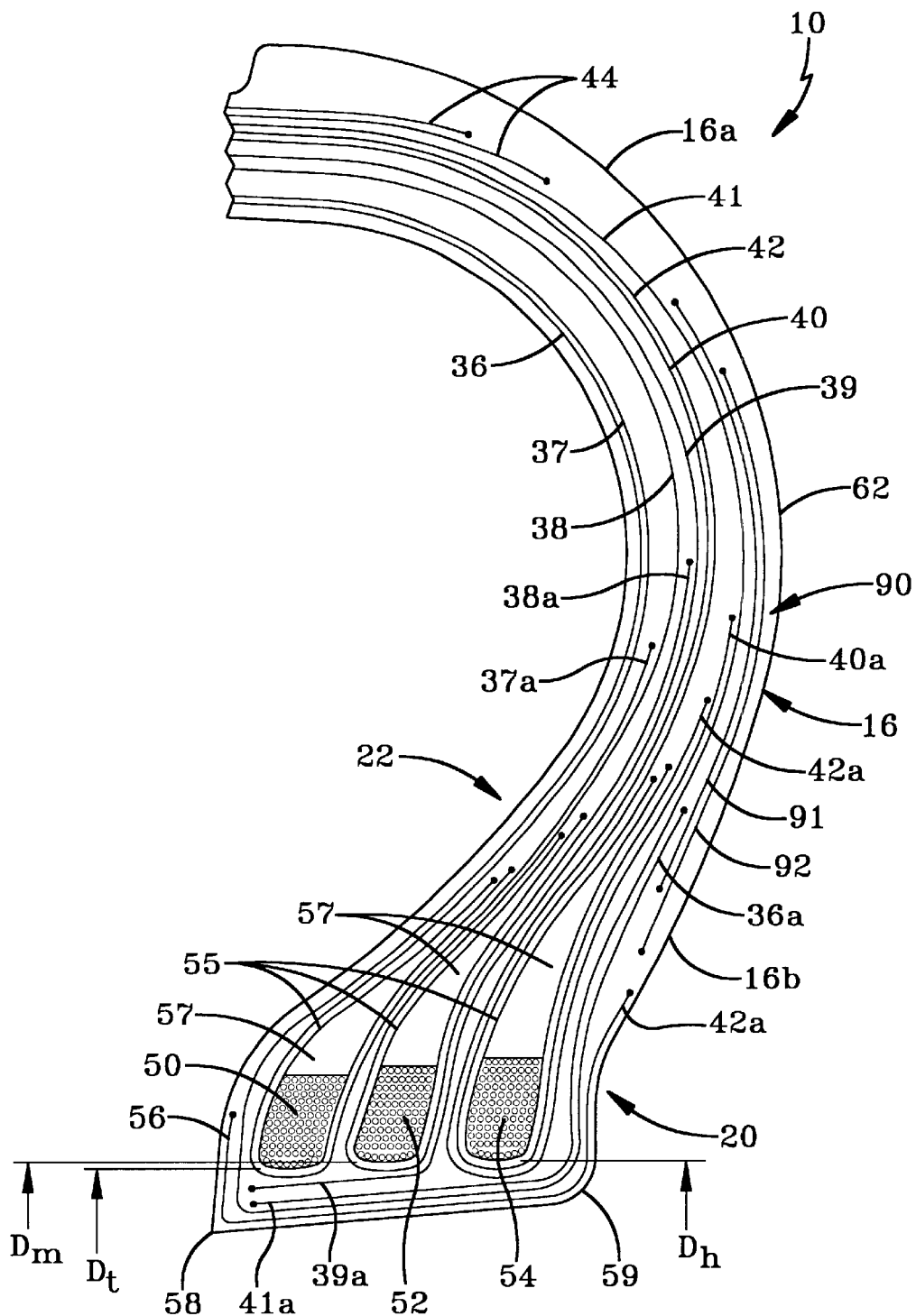
FIG. 4 is a further enlarged cross-sectional view illustrating one side or half of a tire made in accordance with the present invention.

Referring to FIGS. 4 of the embodiment illustrated, there is shown the group of structural components employed in the tires.

Radially above each bead core 50,52,54 is an elastomeric apex 57. Wrapped about each bead core and axially adjacent each apex is a flipper 55. Wrapped about the entire bead structure is a chafer 56. The chafer 56 extends radially inwardly from an axially outer end toward the bead heel 59, turns axially inwardly extending to the bead toe 58 where the chafer 56 turns radially outwardly to an axially inner end. In the embodiment as illustrated, the air chamber formed by the tire is surrounded by a generally air impervious innerliner 17 extending from bead to bead.

As illustrated in FIGS. 3 and 4, a reinforcement insert 90 is radially outward of the pair of plies 40,41. As shown, the inserts 90 are positioned on the radially outer side of the plies and extend from adjacent or slightly above the bead cores radially and axially outwardly to a radially outer end below the tread 12 in the upper sidewall 14A,16A region between the carcass 22 and the sidewall.

In the best mode of practicing the invention, the reinforcement inserts 90 consist of a pair of cord reinforced members 91,92. The cords in the reinforced members 91,92 are at bias angles relative to the circumferential center line, the cord angle of one member of a pair being equal to but opposite in orientation relative to the cords of the adjacent member of the same pair.

It is believed preferable that the insert cords have a tensile elongation at break substantially similar to the nylon cord of the plies. For that reason, the cords in the preferred embodiment were made of nylon. Alternatively, the cords could be any other suitable textile type material.

It is believed that the reinforcement insert 90 could be fabricated from an elastomeric material having fiber reinforced materials.

In the preferred embodiment the reinforcement insert 90 extends circumferentially around the tire 10 on both sides. The purpose of the reinforcement insert 90 is to increase the carcass 22 lower to upper sidewall impact durability with a corresponding decrease in weight when compared to conventional bias ply aircraft tires. The carcass impact strength is increased by locating impact absorbing reinforcement inserts 90 in the sidewalls 14,16.

In a first use of the invention as illustrated in FIG. 1, the inserts 90 were fabric plies 91,92 having the same green angle as the adjacent full casing plies. The insert fabric plies 91,92 were located in the tire 10 in pairs, one fabric member 91 oriented at an angle left and one fabric member 92 at an equal angle right. One such two-ply fabric insert 90 was located adjacent the axially outer side of the bead core 54 and extended radially outwardly to the upper sidewall portion 16A. The inserts 90 were located radially outward of the full band plies and had the radially inner ends purposely terminated such that the insert ends did not extend around the bottom of the bead 54.

Although one set of inserts 90 per tire side was contemplated in the early evaluation of this invention, it was determined that one set on each side was sufficient in the application being evaluated. One, two, three or four sets of inserts 90 per tire side can be used, depending on how much additional carcass impact strength is required.

Although the inserts 90 were used having pairs of bias angled cord reinforced members 91,92, it is believed that the cord reinforced members 91,92 can be individually used. Also in the above description, the cord reinforced members had bias angles in the same range as the carcass plies. Alternatively, higher angles up to 90° could be used.

Historically, bias ply aircraft tires have been designed with full width carcass plies, which extend from a bead bundle on one side of the tire to the bead bundle on the other side of the tire. In order to increase carcass strength in any one area of the tire, it was common practice to add fill width plies to the carcass. The present invention, by adding fabric or fiber inserts between the plies and the sidewall of the tire, strengthens only the area requiring the impact strength increase. Since full plies are not used, there is a substantial tire weight savings.

Figure 2:
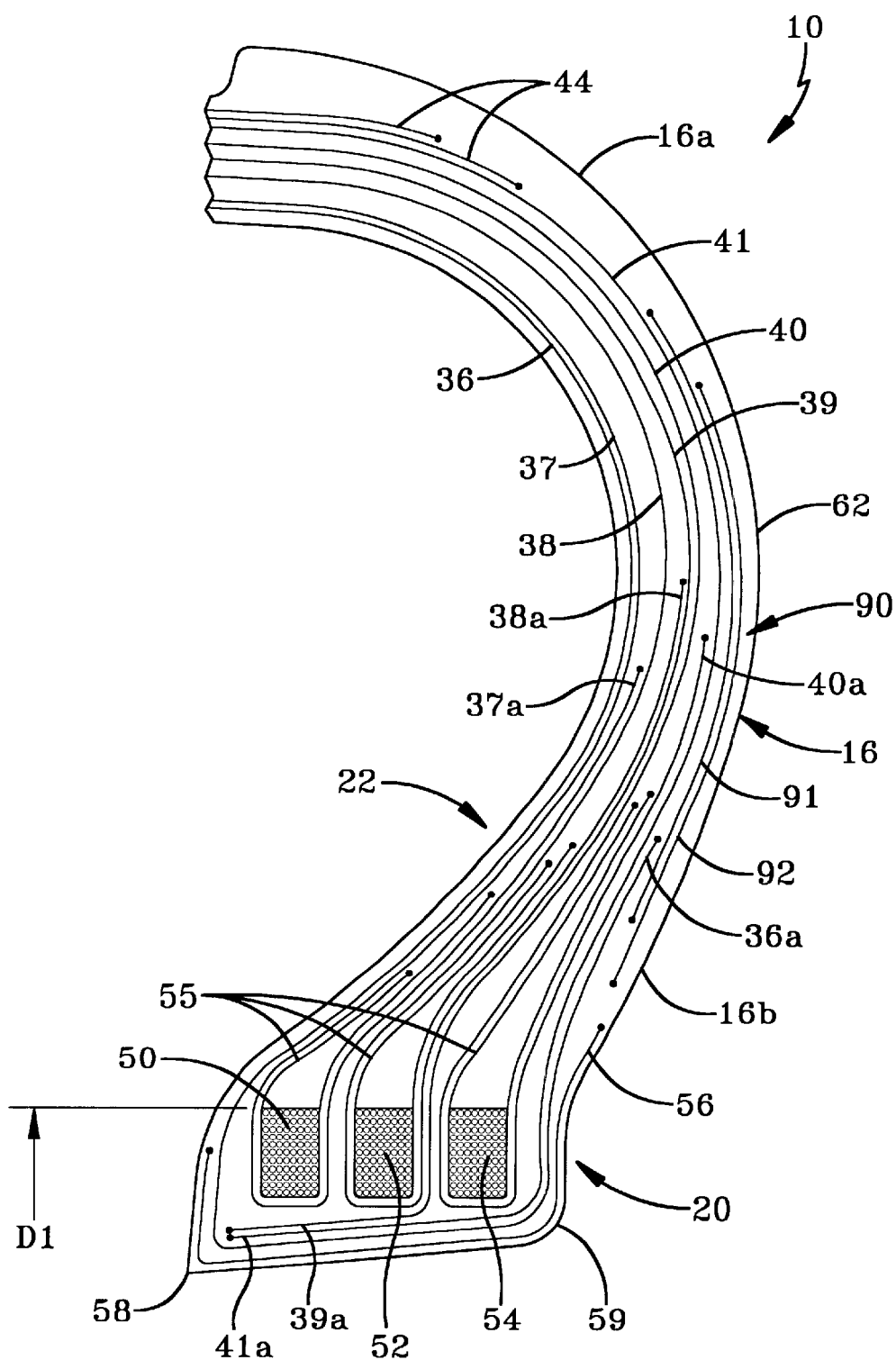
FIG. 2 is an enlarged cross-sectional view illustrating one-half of the prior art tire of FIG. 1.

An aircraft tire 10 built in accordance with the prior art invention as shown in FIGS. 1 and 2 was tested against standard production aircraft tires for impact durability. The standard or control tire was size 32×11.5-15 and the test tire 10 was made of the same materials and of similar construction as the standard tire, except for the addition of the fabric reinforced insert plies 91,92 on each tire side. The test tire 10, according to the present invention, exhibited a marked improvement over the impact durability of the standard tire without inserts.

One of the most rigorous requirements of the MacDonald Douglas F/A-18E/F bias main aircraft tire is for the tire 10 to survive the 1-5/8" diameter cable load test at more than 5 times rated tire load applied at a camber angle of 10.2 degrees. This severe test pinches the tire sidewall between the wheel and the cable on one side of the tire which can result in the cutting of the carcass plies and if excessive, can cause a failure of the tire structure.

To protect the tire carcass 22 in the sidewall area from such an operation, two layers of fabric 91,92 starting from the tire shoulder area 16A to just above the bead area 20 were inserted between the tire carcass 22 and sidewall 16. The two layers 91,92 are of the same material and ply angle as the carcass plies and are offset 0.5" to avoid high stress concentration at the layer edges. The carcass material is 1260/2 nylon.

This original F-18 tire was constructed with six ply pairs and three identical bead cores having 8 columns and 7 rows of bead wire in each bundle. The tire had a minimum burst pressure of 1200 psi. This prior art tire experienced some cuts in the rim flange area during severe airframe drop test and flight test. A higher design standard was requested requiring a minimum burst pressure of 1400 psi.

A modified construction using 14 plies, two sidewall inserts and 3-9×7 bead cores was attempted in a test tire. While the tire performed, the failure mode was observed to be in the bead core closest the heel. Finite element analysis confirmed that the bead core adjacent the heel was stressed sufficiently to cause a tensile break prior to the crown failing.

Analysis of this failure mode lead to the development of a combination of bead cores wherein the heel bead core had one more row of bead wire than the middle bead core.

The test tire according to the present invention used a 12×8 (96 bead wire) construction at the bead heel core, an 11×8 (88 bead wire construction in the middle, while the bead toe core used a 12×8 (96 bead wire construction). The bead heel core had a 15.70 inch inside diameter $d_h$, the middle core a 50.60 inch inside diameter $d_m$, and a bead toe core had a 15.54 inch inside diameter $d_t$.

Of 14 test tires subjected to a minimum burst pressure in excess of 1400 psi, all 14 test tires burst in the crown area.

Overall bead wire forces in the inventive design are less than those of the prior art design.

The equivalent stress (von Mises) in the three bead bundles at 950 psi inflation pressure for the original and the new design were compared. For the original design as shown in FIGS. 1 and 2 half of the heel bead bundle has exceeded the yield point. Whereas, yielding is confined to only a few bead wires in the new design of FIGS. 3 and 4.

In metal plasticity, material behaves elastically for stress levels less than the yield stress, and the plastic flow occurs for a stress level above the yield stress. The total strain energy density can be decomposed into elastic and plastic energy densities. During plastic flow, the plastic strain energy accumulates until the ultimate failure.

The plastic energy density is a measure of permanent deformation (damage). The total plastic energy density in the new design is much less than the old design, and this difference increases with increasing tire inflation pressure. For example, a 950 psi inflation pressure, the plastic energy density in the original design is ten times that of the new design. That is, the old design will fail at much lower pressure than the new design. This is consistent with the experimental observation.

The tire design of the present invention is believed to be far superior than the prior art tire of a similar size using the same rim. Heretofore it was believed that an overall increase in tire size and rim construction might be required to meet the much higher loads and abuse the tire will be asked to survive in the future. The present invention enables the aircraft mainframe not to be changed to accommodate larger sized tires. This is believed to be a very valuable design improvement.

What is claimed is:

1. An bias aircraft tire having a carcass reinforced by six or more ply pairs, the six or more ply pairs extend from one bead portion through a crown portion to an opposite bead portion each bead portion, has three bead cores, a first heel bead core, a middle bead core and a third toe bead core, each bead core has one or more ply pairs wrapped around and extending radially upwardly the bias aircraft tire characterized by; the three bead cores each being of a substantially rectangular cross-section having a semi-rounded radially innermost portion, each of the three bead cores having lateral rows and vertical columns of bead wires, wherein the middle bead core has at least one row or one column less of bead wires than the heel bead core.

2. The bias aircraft tire of claim 1 wherein the bead cores each have an inside diameter d, the inside diameter $d_m$ of the middle bead core being less than the first heel bead core inside diameter $d_h$.

3. The bias aircraft tire of claim 2 wherein the third toe bead core has one or more row or column than the middle bead core.

4. The bias aircraft tire of claim 3 wherein the third toe bead core has an inside diameter $d_t$ equal to or greater than $d_m - (d_h - d_m)$.

5. The bias aircraft tire of claim 1 wherein the number of pairs of carcass plies equals 7.

6. The bias aircraft tire of claim 1 wherein the tire size is 32×11.5-15.

7. The bias aircraft tire of claim 6 wherein the first heel bead core has 12 rows and 8 columns.

8. The bias aircraft tire of claim 7 wherein the first heel bead core has 96 bead wires in a cross-section.

9. The bias aircraft tire of claim 8 wherein the middle bead core has 88 bead wires in a cross-section.

10. The bias aircraft tire 7 wherein in inside diameters d of the heel bead core is 15.70 inches, the middle bead core is 15.60 inches and the toe bead core is 15.54 inches.

* * * * *